(12) United States Patent
Wang et al.

(10) Patent No.: US 8,705,810 B2
(45) Date of Patent: Apr. 22, 2014

(54) DETECTING AND INDEXING CHARACTERS OF VIDEOS BY NCUTS AND PAGE RANKING

(75) Inventors: Tao Wang, Beijing (CN); Jianguo Li, Beijing (CN); Du Yangzhou, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 12/006,019

(22) Filed: Dec. 28, 2007

(65) Prior Publication Data

US 2009/0169065 A1 Jul. 2, 2009

(51) Int. Cl.
*G06K 9/00* (2006.01)

(52) U.S. Cl.
USPC ............................ 382/118; 382/103; 382/115

(58) Field of Classification Search
USPC .......................................... 382/103, 115–118
See application file for complete search history.

(56) References Cited

U.S. PATENT DOCUMENTS

| | | | | |
|---|---|---|---|---|
| 4,672,679 A * | 6/1987 | Freeman | ................. | 382/233 |
| 5,164,992 A * | 11/1992 | Turk et al. | ................. | 382/118 |
| 5,675,663 A * | 10/1997 | Koerner et al. | ................. | 382/181 |
| 6,301,370 B1 * | 10/2001 | Steffens et al. | ................. | 382/103 |
| 6,697,503 B2 * | 2/2004 | Matsuo et al. | ................. | 382/118 |
| 7,149,357 B2 * | 12/2006 | Lee et al. | ................. | 382/209 |
| 7,783,085 B2 * | 8/2010 | Perlmutter et al. | ......... | 382/118 |
| 2003/0108244 A1 * | 6/2003 | Li et al. | ................. | 382/227 |
| 2004/0247183 A1 * | 12/2004 | Molander | ................. | 382/209 |
| 2006/0072811 A1 * | 4/2006 | Porter et al. | ................. | 382/159 |
| 2008/0086688 A1 * | 4/2008 | Chandratillake et al. | ..... | 715/719 |
| 2011/0115893 A1 * | 5/2011 | Hayashi | ................. | 348/77 |

OTHER PUBLICATIONS

Arandjelovic, O., Shakhnarovich, G., Fisher, J., Cipolla, R. and Darrell, T. Face Recognition with Image Sets Using Manifold Density Divergence. In Proceedings of the 2005 IEEE Computer Society Conf. on CVPR. 2005, 581-588.

Arandjelovic, O. and Zisserman, A. Automatic Face Recognition for Film Character Retrieval in Feature-Length Films. In Proceedings of the 2005 IEEE Computer Society Conf. on CVPR. 2005, 860-867.

Everingham, M. and Zisserman, A. Identifying Individuals in Video by Combining 'Generative' and Discriminative Head Models. In Proceedings of the Tenth IEEE Int. Cont. on Computer Vision. 2005, 1103-1110.

(Continued)

*Primary Examiner* — Alex Liew
(74) *Attorney, Agent, or Firm* — Schubert Law Group PLLC

(57) ABSTRACT

Apparatuses, systems, and computer program products that detect and/or index characters of videos are disclosed. One or more embodiments comprise an apparatus an apparatus having a feature extraction module and a cast indexing module. The feature extraction module may extract features of a scale invariant feature transform (SIFT) for face sets of a video and the cast indexing module may detect one or more characters of the video via one or more associations of clusters of the features. Some alternative embodiments may include a cast ranking module to sort characters of the video, considering such factors as appearance times of the characters, appearance frequencies of the characters, and page rankings of the characters. The apparatus may associate or partition the clusters based on a normalized cut process, as well as detect the characters based on measures of distances of nodes associated with the features. Numerous embodiments may detect the characters based upon partitioning the clusters via solutions for eigenvalue systems for matrices of nodes of the clusters.

23 Claims, 6 Drawing Sheets

(56) References Cited

OTHER PUBLICATIONS

Lee, K. C. and Kriegman, D. Online Learning of Probabilistic Appearing Manifolds for Video-based Recognition and Tracking. In Proceedings of the 2005 IEEE Computer Society Conf. on CVPR. 2005, 852-859.

Stan Z., L., Jain, A. K. Handbook of Face Recognition. Springer, NY, 2004.

* cited by examiner

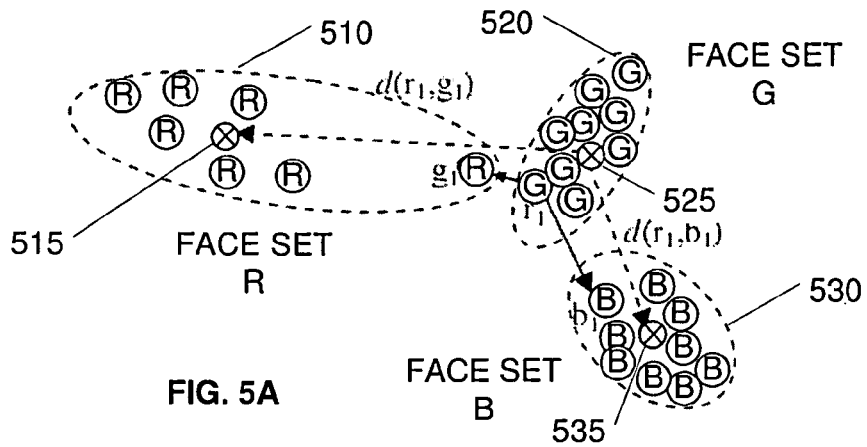
FIG. 5A
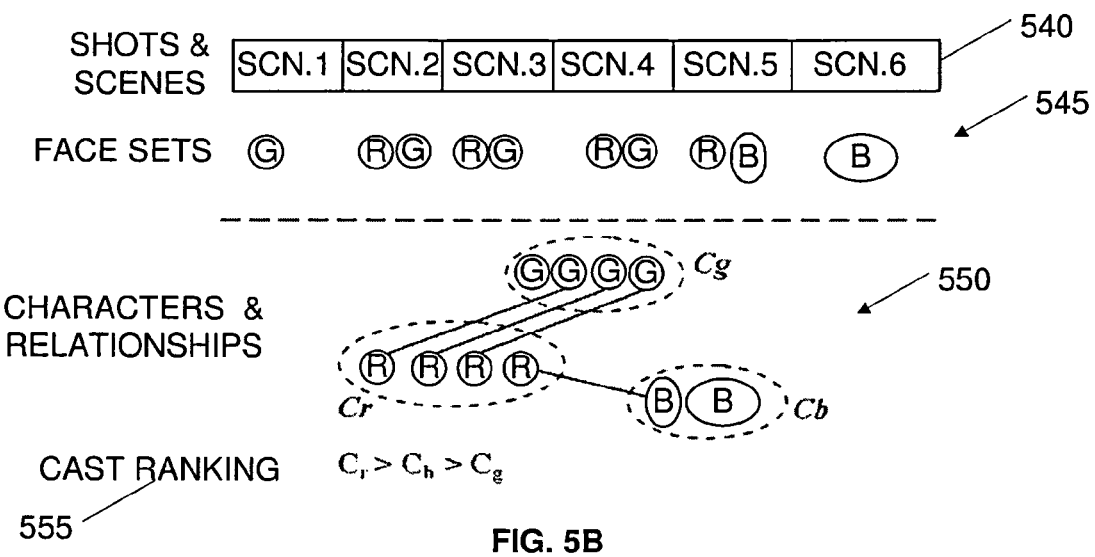
FIG. 5B
| Character | Cr | Cg | Cb |
|---|---|---|---|
| At(Ci) | 0.2 | 0.2 | 0.6 |
| Af(Ci) | 0.4 | 0.4 | 0.2 |
| L(Ci) | 4 | 3 | 1 |
| Ap(Ci) | 0.48 | 0.36 | 0.16 |
| IF(Ci) | 0.40 | 0.34 | 0.26 |
FIG. 5C

DETECTING AND INDEXING CHARACTERS OF VIDEOS BY NCUTS AND PAGE RANKING

FIELD

The embodiments herein generally relate to the field of image analysis. More particularly, the embodiments relate to systems, apparatuses, and computer program products for detecting and/or indexing characters of videos.

BACKGROUND

The explosion of video media, such as video clips on the World Wide Web, digitized movies, recordings of television (TV) programs on personal video recorders, and home videos, has generated an increasing demand for video mining and video indexing. For example, semantic based video mining techniques, such as news abstraction, sports highlights detection, indexing, and retrieval, are commonly sought after by owners of the media. People often want to index the content of such video data, such as indexing the different characters, or cast of characters, in videos. By cast indexing, owners and viewers of the videos can discover and refer to characters in the videos. For example, a person who may desire to view a video on the World Wide Web may first determine who appears in the video, how frequently they appear, in which scenes they appear, with whom they appear, etc. In other words, indexing characters of the video may allow one to more efficiently browse video clips and other video media.

For detecting characters and cast indexing videos, the human face is usually an important visual cue, often more important than auxiliary cues such as voice or speech, and clothing. Automatic face detection and recognition techniques can be employed as main ways and means for cast indexing. However faces in videos, especially films, sitcoms, and home videos, usually have large variations of pose, expression and illumination which help explain why reliable face recognition is still a very challenging problem for computers.

To reduce the adverse effect of variations in image for video-based face recognition, a lot of methods have been attempted with varying degrees of success. Some people have applied affine warping and illumination correction for face images in an attempt to alleviate the adverse effects induced from pose and illumination variations. However, affine warping and illumination correction are unable to adequately handle out-of-plan face rotation. Others have attempted face recognition based on manifold analysis. Unfortunately, the manifolds of faces and relationships among them in real videos are too complex to be accurately characterized by simplified models. Although some people employ three-dimensional face models to enhance the video-based face recognition performance, three-dimensional face modeling techniques encounter difficulty when trying to accurately recover head pose parameters, even when using state-of-the-art registration techniques. Further, such three-dimensional face modeling techniques are often not practical for real-world applications. In a word, it is very hard to build a robust cast indexing system based only on face recognition techniques.

BRIEF DESCRIPTION OF THE DRAWINGS

Aspects of the embodiments will become apparent upon reading the following detailed description and upon reference to the accompanying drawings in which like references may indicate similar elements:

FIG. 5A illustrates two measures of distances between clusters of three face sets;

FIG. 5B illustrates how the characters of FIG. 5A may appear in six scenes of a video;

FIG. 5C depicts a table showing various factors that may be used to rank the three characters of FIG. 5A and FIG. 5B.

DETAILED DESCRIPTION OF EMBODIMENTS

Figure 1:
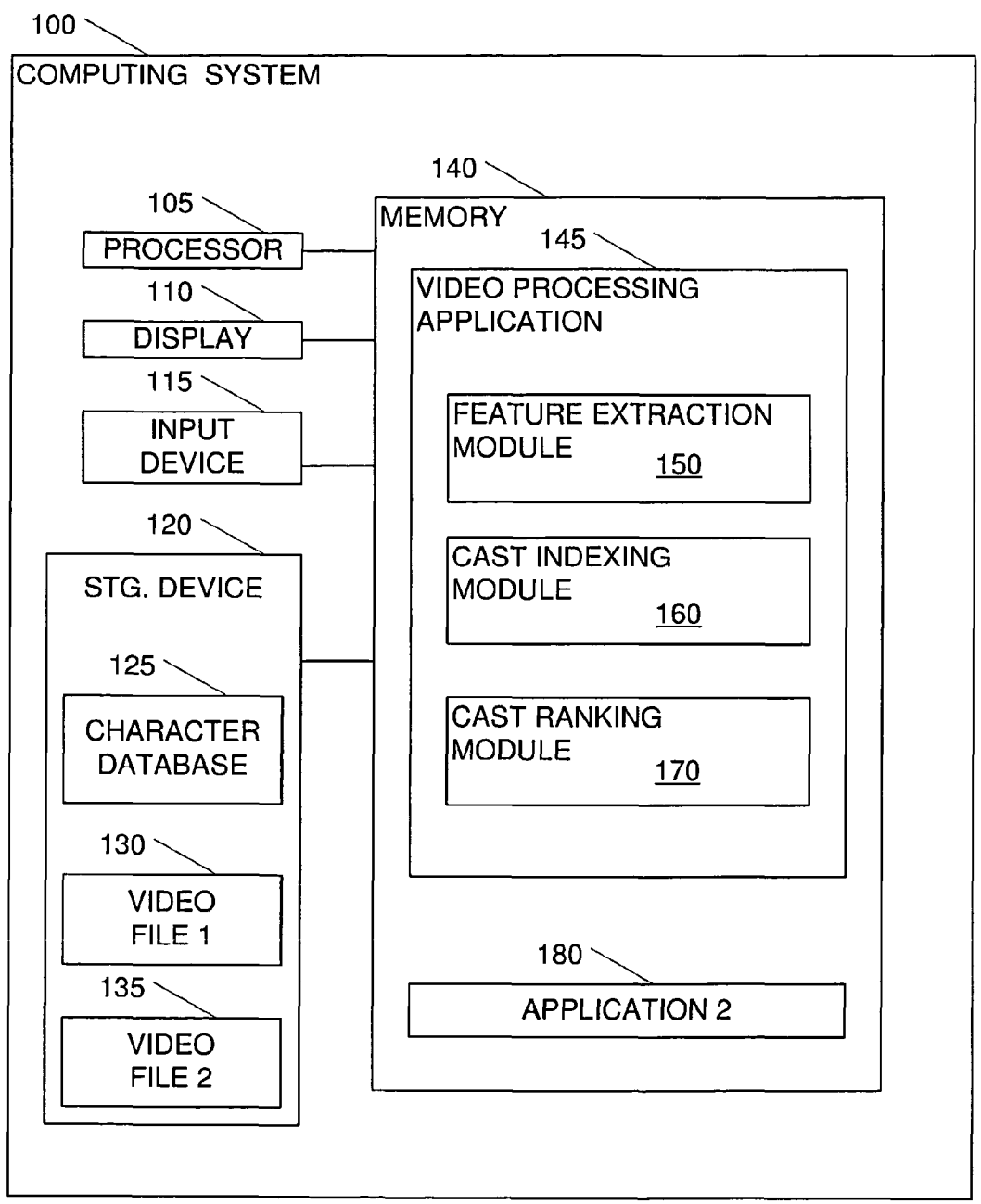
FIG. 1 depicts a computing system that may detect and index characters in video, comprising a video application being executed in memory of the computing system.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Apparatuses, systems, and computer program products that detect characters in video, such as to index a cast of characters in the video, are contemplated. Some embodiments comprise an apparatus having a feature extraction module and a cast indexing module. The feature extraction module may extract features of a scale invariant feature transform (SIFT) for face sets of a video and the cast indexing module may detect one or more characters of the video via one or more associations of clusters of the features. Some alternative embodiments may include a cast ranking module to sort characters of the video, considering such factors as appearance times of the characters, appearance frequencies of the characters, and page rankings of the characters. Even further alternative embodiments may also include a shot detection module to detect shots of the video and a scene detection module to detect scenes of the video.

In some of the further alternative embodiments, the feature extraction module may detect faces of the video to generate the face sets. In various alternative embodiments, the feature extraction module may normalize one or more faces in the video and detect facial landmarks for the normalized faces. In numerous embodiments, the apparatus may associate the clusters based on a normalized cut process. In various embodiments, the apparatus may detect the character based on a distance measure of nodes associated with the features.

At least one embodiment may consider color histogram features of the face sets in generating the association.

Some embodiments comprise a system having a storage medium to store video, a feature extraction module to extract features of a face of a character in the video and generate clusters of nodes via the features, and a cast indexing module to detect the character based upon partitioning of the clusters, wherein the partitioning is via normalized cuts of the nodes. One or more embodiments may also comprise a cast ranking module that ranks the character based upon such factors as an amount of time that the character appears in the video, a frequency of appearance for the character, and/or a number of appearances of the character with a second character.

In some embodiments, the feature extraction module may detect shots or scenes of the video and track the face in the shots or scenes. Various embodiments may partition the nodes based on distance measures of the nodes. Numerous embodiments may detect the character based upon partitioning the clusters via a solution for an eigenvalue system for matrices of nodes of the clusters.

Some embodiments comprise a computer program product with computer usable program code for detecting a character of a video, extracting features of a SIFT for face sets of the video, generating clusters of features for the face sets, and detecting the character based on an association of the clusters. One or more embodiments also include computer usable program code for tracking a face of the character in frames of the video, wherein the tracking is used to generate the face sets. Other embodiments further comprise computer usable program code for determining a distance measure between nodes of clusters.

Numerous embodiments have program code for partitioning clusters of the face sets, wherein at least part of the association process involves creating or determining the partition. Many embodiments have program code for partitioning or separating the clusters based upon normalized cut processes. Some alternative embodiments may also have code for ranking the character based upon an importance factor. In such alternative embodiments, the program code for ranking the character may involve calculating an importance factor. For example, the importance factor may be calculated using a linear weighted average of an appearance time, an appearance frequency, and a page rank of the character in the video.

In the following discussions, terms such as "shots", "scenes", and "frames" are used. Similar to processing text with words, sentences, and paragraphs of a document, video processing may be thought of as processing video frames, shots, and scenes of a video file or video sequence. A frame may comprise a single image, which one may consider similar to a digital picture. A shot may comprise a set of video frames captured by a single camera in one consecutive recording session. A scene may be a subdivision of a video in which the setting is fixed and time-continuous, such as presenting a sequence of continuous action in a single location.

Turning now to the drawings, FIG. 1 illustrates a computing system 100 that may detect characters in video. For example, computing system 100 may comprise a desktop or laptop computer executing a video processing application 145 in memory 140. In alternative embodiments, computing system 100 may comprise a face recognition system for video, a cast indexing system for movies, a computer used to perform video mining of Internet video clips, a video surveillance system, or a video summarization system, as examples. Video processing application 145 may detect characters in a video clip downloaded from the Internet or detect characters in a movie or TV show, such as a movie or a TV show recorded by personal video recorder (PVR).

In the embodiment depicted in FIG. 1, video processing application 145 may index characters, or cast members, of the video by using normalized graph cuts, or normalized cuts (NCuts), and page ranking, which will be discussed in more detail later. The cast indexing system, comprising video processing application 145, may have three modules: feature extraction module 150, cast indexing module 160, and cast ranking module 170.

In various embodiments, a computing system like computing system 100 may execute a variety of different applications. For example, in addition to video processing application 145, computing system 100 may execute a second application 180, which may be a video viewing application, such as a web browser or dedicated video player application. Alternatively, in different embodiments, application 180 may comprise an application unrelated to processing video, such as an Internet instant messaging application, a time management application, an e-mail application, and so on. In other words, computing system 100 may be used for other purposes, not just for video processing, in one or more embodiments.

In various embodiments, a system may have a processor, such as processor 105, for executing program instructions of applications, such as video processing application 145 and application 180, that may be in memory 140. While executing program instructions of video processing application 145, computing system 100 may display video images, or information pertaining to the video, on a monitor or other computer display, such as display 110. For example, display 110 may allow a video editor to view different scenes of a movie as video processing application 145 performs such tasks as detecting shots, detecting scenes, detecting characters in scenes, generating face sets for the characters, etc. Display 110 may also allow viewing of the end result of such processing operations, such as the names of characters that are in the video, how frequently they appear, etc.

Using input device 115 the user of computing system 100 may interact with video processing application 145. In one or more embodiments, input device 115 may comprise a keyboard and/or a mouse, allowing a person to perform such actions as viewing different scenes of a video or loading and saving video files to be used with video processing application 145. In some embodiments input device 115 may comprise a tablet and stylus, such as a pressure-sensitive surface of a personal digital assistant (PDA) that recognizes handwritten characters. In even further embodiments input device 115 may comprise an audible input device, such as a microphone used for speech recognition, or an infrared remote control interface. For example, in one embodiment input device 115 may allow a user to perform cast indexing for one or more TV shows or movies that have been recorded by a PVR, using a device such as a remote control.

Depending on the embodiment, computing system 100 may run a variety of different operating systems. For example, in one embodiment computing system 100 may use Unix®. In another embodiment, computing system may use Microsoft® Windows®, Linux®, or Mac OS®, as examples. Other alternative embodiments may have no operating system at all. For example, computing system 100 may comprise a state machine or microcontroller executing firmware instructions stores, such that no operating system is necessary.

One or more videos may be stored on a storage medium of a storage device 120 and accessed by computing system 100. For example, storage device 120 may comprise one or more of a variety of different mass storage devices used to store video files 130 and 135, which may comprise video clips or movies as examples. For example storage device 120 may comprise a parallel or serial hard disk drive. Alternatively, storage device 120 may also comprise an optical storage device, such as a rewritable compact disc (CD) or a digital versatile disc (DVD) drive, having storage mediums of a CD and DVD, respectively. In other embodiments, storage device 120 may comprise a flash memory device, such as a universal serial bus (USB) thumb drive. Storage device 120 may also store other information, such as character database 125. For example, character database 125 may store information of characters detected in video files 130 and 135, such as names of the characters, how often each of them appears, which characters appear most frequently, which characters appear with certain other characters, etc.

While not shown in FIG. 1, alternative embodiments of a computing device in a system may connect to other computers of the system using a variety of different hardware. For example, computing system 100 may comprise a desktop computer connected to another computer via a wireless communications card, or an Ethernet cable coupled to a local or wide area network (LAN or WAN). The desktop computer may download and process video files from the Internet. As the above example illustrates, various embodiments of a system may comprise an almost limitless number of wired and wireless communication devices, allowing computing devices of a system to communicate with each other to share and/or process video files, wherein the computers may be located close to or remote from each other.

Figure 2A:
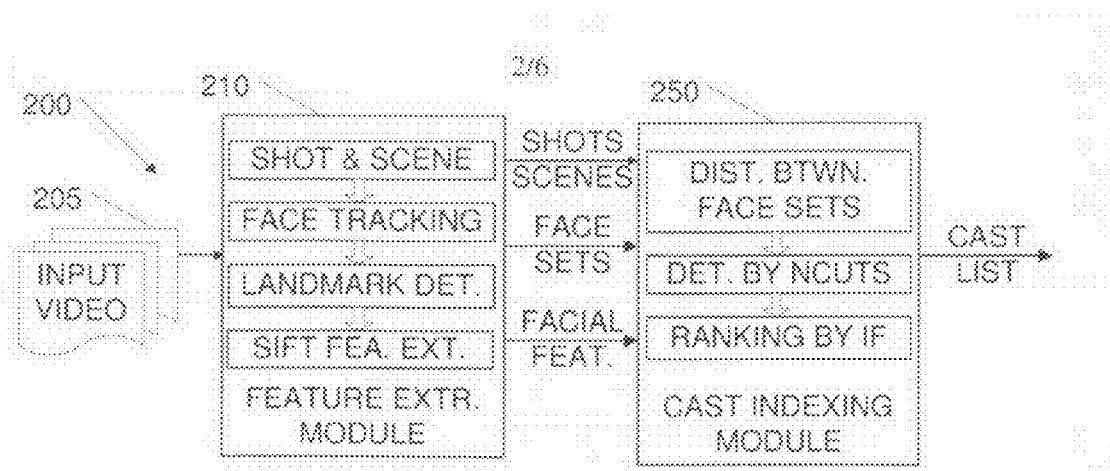
FIG. 2A gives an overview of how a video may be processed by a feature extraction module and a cast indexing module to generate a cast.

In many types of video media, such as movies and recordings of a TV series, characters frequently appear in different shots, resulting in large numbers of consecutive face images. Such different shots may provide rich dynamic facial information and multi-view face exemplars of individual characters, which may allow an apparatus or system to detect characters by clustering faces of those characters. To illustrate in more detail how a system or an apparatus may detect and index characters of video, we turn now to FIG. 2A and FIG. 2B. FIG. 2A provides an overview of how a video 205 may be processed by an apparatus 200, comprising a feature extraction module 210 and a cast indexing module 250, to generate a cast list. For example, video 205 may correspond to video file 130 shown in FIG. 1, with feature extraction module 210 and cast indexing module 250 corresponding to feature extraction module 150 and cast indexing module 160, respectively. Video 205 may represent a movie having numerous scenes, shots, and frames. For the sake of an example, FIG. 2B may represent a portion of video 280 for video 205. The portion of video 280 depicts one scene from numerous scenes 286, where in the scene is shown divided into numerous shots 288 and further subdivided into numerous frames 290.

When operating, feature extraction module 210 may first detect shot boundary and scene segmentation. For example, feature extraction module 210 may detect the beginning and ending boundaries of a scene in the portion of the video 280, as well as the boundaries for the different shots 288, and frames 290. The feature extraction module may then detect near frontal faces 284, track the faces (element 294) in the successive shots and frames, and generate the different face sets 282 corresponding to the successive frames and shots. The feature extraction module 210 may normalize the face images of the face sets 282 and extract local SIFT features from the face sets 282.

Based on the shots, scenes, face sets, and facial features detected and generated by feature extraction module 210, cast indexing module 250 may detect characters (element 296) in the portion of the video 280 as well as other portions of video 205. Cast indexing module 250 may use a face set as a basic processing unit to detect characters. Using a face set to detect characters may be approached as solving a pattern clustering problem. By modeling face sets as nodes of a graph, cast indexing module 250 may employ normalized graph cuts to specify partitions of the nodes. In other words, cast indexing module 250 may detect characters using an NCut algorithm to cluster face sets. Additionally, in alternative embodiments, cast indexing module 250 may employ other techniques for clustering of nodes, such as a hierarchical clustering process, or a spectral clustering process. To deal with outlier faces from variations of pose, expression, illumination, and poor face normalizations, cast indexing module 250 may use a local neighbor distance to measure the similarity between face sets. Additionally, to allow for such benefits as efficient browsing of video clips and movies, cast indexing module 250 may sort characters by calculating an importance factor (IF) for each of the characters. An IF, which may comprise a fused score of page ranking, appearance time, and appearance frequency used to rank cast characters. Use of page ranking for the characters may also allow for the discovery of latent relationships between characters.

Figure 3:
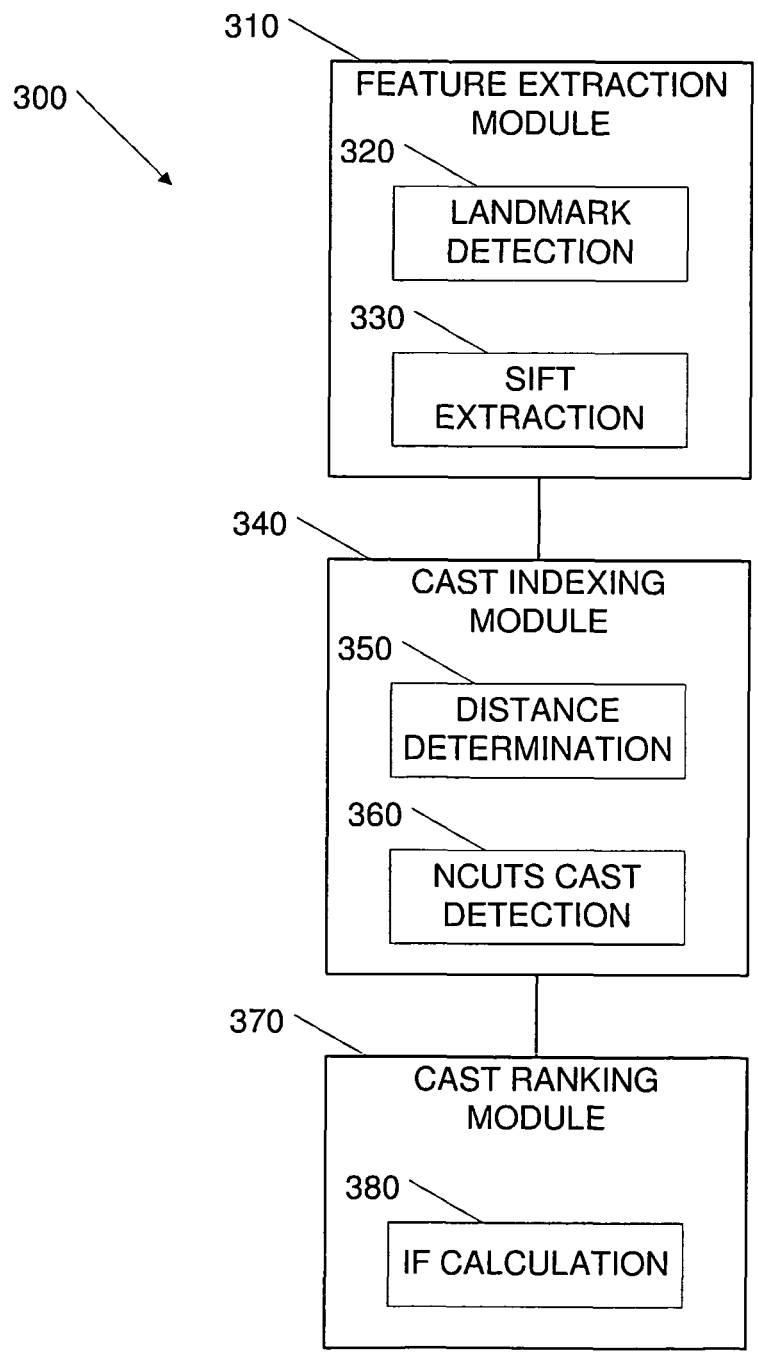
FIG. 3 depicts an apparatus that may detect and index characters in video, comprising a feature extraction module, a cast indexing module, and a cast ranking module.

FIG. 3 depicts an alternative embodiment of an apparatus 300 that may process a video, similar to the manner in which apparatus 200 may process video 205. Apparatus 300 has a feature extraction module 310, a cast indexing module 340, and a cast ranking module 370. Each module of apparatus 300 may comprise software, hardware, or a combination of both software and hardware. All modules may be of the same form in some embodiments, such all as being implemented as software or firmware encoded instructions, while some modules may be in a different form than the other modules in other embodiments. For example, in one embodiment feature extraction module 310 and cast ranking module 370 may comprise program algorithms, such as software routines of a program or application, to be executed by a processor, while cast indexing module 340 comprises an application-specific integrated circuit (ASIC) chip that uses only hardware components to rapidly determine distance measures and cast detection calculations.

Alternative embodiments of apparatus 300 may perform more or fewer functions than those illustrated in FIG. 3. For example, for the embodiment of apparatus 300 depicted in FIG. 3, feature extraction module 310 could perform the functions of shot and scene detection or face tracking. Alternatively, such functions may be carried out by one or more other modules not shown in FIG. 3. For example, another module may pull segments of video from a video file, process the sequences of images contained in the video file to detect shots and faces in those scenes, track the movement of faces in the shots or scenes, generate face sets, and transfer the generated face sets to feature extraction module 310. In other words, alternative embodiments of apparatus 300 may include more or fewer modules than those depicted in FIG. 3.

Feature extraction module 310 may use the face sets as basic processing units for cast indexing. Face sets may provide information from previous frames concerning multi-view facial exemplars which belong to the same person or character. The use of face sets may also decrease the data size, or the amount of video footage, needed for face clustering algorithms or functions performed by cast indexing module 340.

Figure 4A:
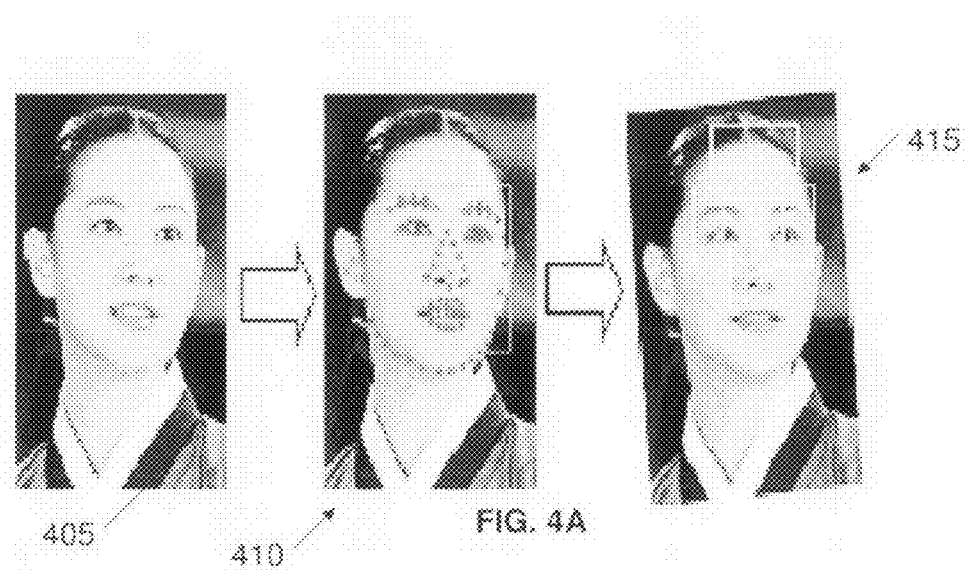
FIG. 4A illustrates how a feature extraction module may detect landmarks on a face and determine local regions for scale invariant feature transform feature extraction.

For each image of a face that is processed, feature extraction module 310 may use an active shape model-based (ASM-based) face alignment algorithm to detect facial landmarks. For example, FIG. 4A illustrates how feature extraction module 310 may detect landmarks on a face and determine local regions for scale invariant feature transform (SIFT) feature extraction. Feature extraction module 310 may receive an image of a face 405. Using the ASM-based face alignment algorithm, landmark detection sub-module 320 may detect a number of landmarks around the eyebrows, the eyes, the nose, the mouth, and the chin (element 410). Using these detected landmarks, landmark detection sub-module 320 may geometrically normalize the facial images into a standard form by affine transformation to remove variations of translation, scale, in-plane and slight out-of-plane rotation. Landmark detection sub-module 320 may then generate five local regions around the face (element 415) to allow for SIFT feature extraction by SIFT extraction sub-module 330. In other words, SIFT extraction sub-module 330 may use the five local regions generated by landmark detection sub-module 320 to extract SIFT features for the image of the face 405, for the regions surrounding the two eyes, the central region of the two eyes, the nose, and the forehead (element 415). SIFT extraction sub-module 330 may extract local features for the facial images. Using local features may allow for more accurate recognition and verification than using global features. While using local features may not always provide greater accuracy, in numerous situations local features may provide greater accuracy for partial occlusions, pose, and illumination variations.

Figure 2B:
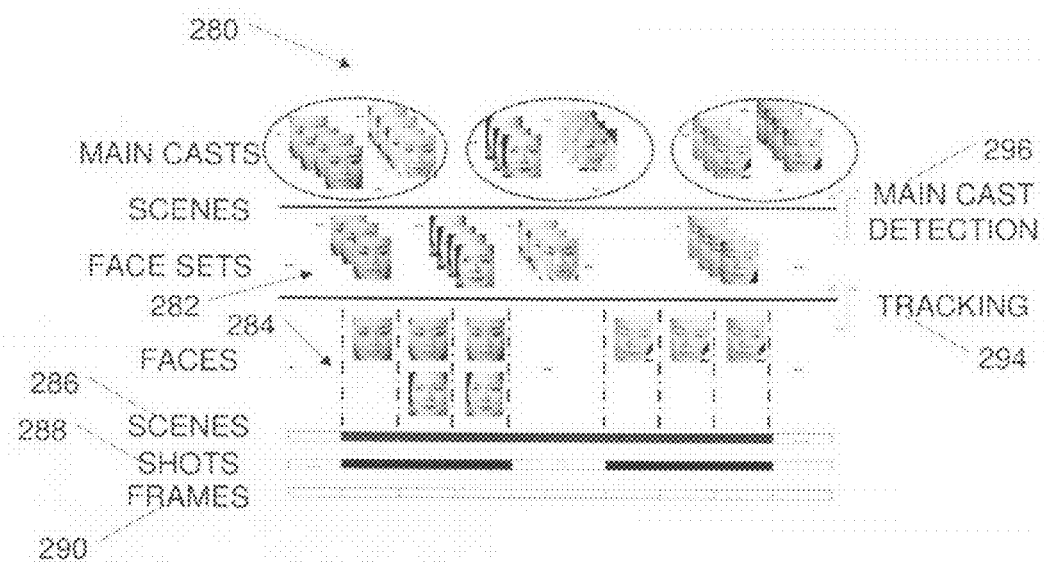
FIG. 2B illustrates how different sections of a video, such as scenes, may be subdivided into shots and frames, from which faces, face sets, and casts may be detected.

As alluded to earlier, another module may track faces in the sequences of images and group the faces of the same characters in each shot into face sets. The number of face images in face sets may often differ from scene to scene and shot to shot. Additionally, characters may appear in multiple shots, resulting in multiple face sets for individual characters. As illustrated in FIG. 2B, various embodiments may attempt to group, or cluster, face sets into bigger aggregations that include all the face sets associated with the same character. If the pose, expression, and illumination of faces dynamically change in a face set, such dynamic changes may provide rich multi-view exemplars for the same people. The multi-view exemplars may help bridge face sets with overlapped face exemplars for face clustering.

Figure 4B:
FIG. 4B depicts four face sets of two characters that may be generated from a video.

Numerous embodiments may use a distance measure between two face sets to cluster or associate face sets for the same characters. To illustrate this concept of clustering, we continue with our previous example of apparatus 300 processing the sequences of images contained in the video file. Feature extraction module 310 may continue processing facial images in the sequences of images contained in the video file with landmark detection sub-module 320 and sift extraction sub-module 330. The sequences of images may comprise the face sets of FIG. 4B. For example, face sets 420, 425, 430, and 435 may represent manifolds of four face sets of two characters in a scene of the video file. Face set 420 and face set 435 may represent two face shots for the first character in the different shots. Face set 425 and face set 430 may represent two face shots for the second character in the two shots. As FIG. 4B illustrates, manifolds of the face sets in feature space may be very complex and quite different from each other. For example, the faces of one character can be very distant, while the faces of a different character may be very near in the feature space. However, two face sets with bigger overlap may have a higher probability of belonging to the same character. To determine these overlaps, or proximal distances, the nodes of the extracted local SIFT features may be compared with each other.

Figure 4C:
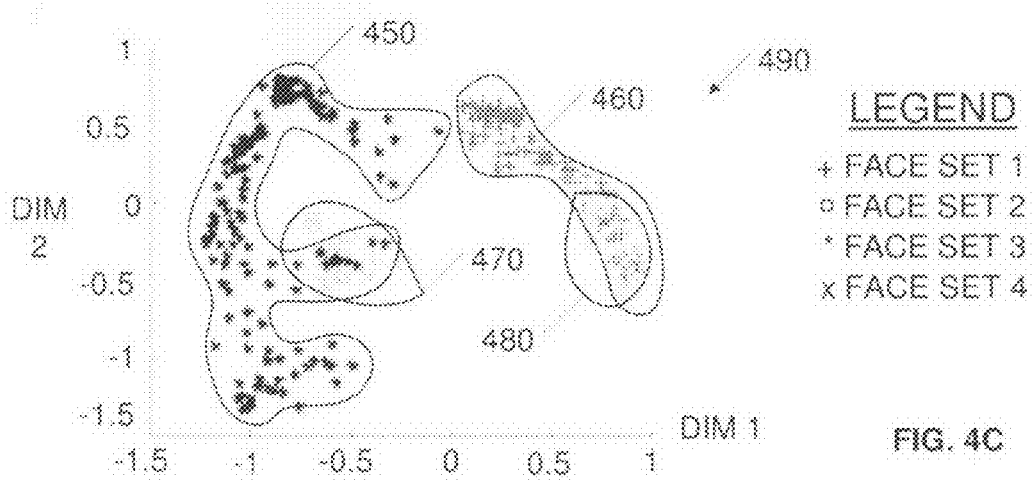
FIG. 4C illustrates how corresponding manifolds of the face sets in FIG. 4B may be visualized in a two dimensional subspace.

Continuing with the example, feature extraction module 310 may process the facial images to generate a plurality of nodes for the extracted local SIFT features for face sets 420, 425, 430, and 435. FIG. 4C illustrates how corresponding manifolds of the face sets in FIG. 4B may be visualized in a two dimensional subspace. In other words, the graph 490 of FIG. 4C may illustrate the spatial relationship of the plurality of nodes generated for the extracted local SIFT features for face sets 420, 425, 430, and 435. Referring to the legend, the "+" symbols may correspond to the nodes for face set 420, shown in cluster 460, and the "x" symbols may correspond to the nodes for face set 435, shown in cluster 480. Similarly, the "□" symbols may correspond to the nodes for face set 425, shown in cluster 470, and the "*" symbols may correspond to the nodes for face set 430, shown in cluster 450. As the graph 490 of FIG. 4C illustrates, clusters 460 and 480 are situated in close proximity with each other and correspond to the extracted local SIFT features for face sets 420 and 435, respectively, belonging to the first character. Likewise, clusters 470 and 450 are in close spatial proximity with each other as well and correspond to face sets 425 and 430, respectively, belonging to the second character. In practice, there may be outliers due to misalignment, variations of pose, variations of expression, or variations in illumination, etc. When clustering face sets, including outliers may the associated error and tend to merge face sets of different characters, or bring them within relatively close spatial proximity with other. However, longer duration videos may help provide relatively large quantities of facial information. If outliers occur infrequently, faces with higher density distribution in the feature space may have a relatively high probability of belonging to the same character. In consideration of this, one fundament may be observed: normal samples may have support from their nearest neighborhood same-face-set samples, while outliers may not.

Distance Measure Between Two Faces

Based on the above observation, one may define a measure of distance, or "distance measure", between two face images by considering their nearest neighborhood support information. In our discussion, k-nearest neighbor may be adopted. Let $S_i$ and $S_j$ represent two face sets, for two faces $x_{im} \in S_i$ and $x_{jn} \in S_j$, the local neighbor distance between $x_{im}$ and $x_{jn}$ may be defined as:

$$d(x_{im}, x_{jn}) = \frac{1}{k^2} \sum_{x_{ip} \in N(x_{im}), x_{jq} \in N(x_{jn})} \|x_{ip} - x_{jq}\| \quad (1)$$

where $N(x_{im})$ is the k neighbors of $x_{im}$ in $S_i$ and $N(x_{jn})$ is the k neighbors of $x_{jn}$ in $S_j$, $\|\cdot\|$ denotes $L_2$ distance between two faces. It may be proved:

$$d(x_{im}, x_{jn}) \propto \left| \sum_{x_{ip} \in N(x_{im})} x_{ip} - \sum_{x_{jq} \in N(x_{jn})} x_{jq} \right| \quad (2)$$

The distance measure defined by Eq. (1) may be equivalent to first applying a smooth filter on the manifold to weaken or remove outlier disturbances, then calculating the distance between the two averaged data points. A module like distance determination sub-module 350 may determine or calculate measures of distances between face images as part of indexing a cast of characters for a video. For example, distance determination sub-module 350 may calculate the distance measure between two faces of face set 420, which may correspond to the distance between two nodes ("+") of cluster 460.

For the sake of another more detailed example of how a module like distance determination sub-module 350 may calculate measures of distances between nodes for face images, FIG. 5A depicts a first cluster of nodes 510 for a face set 'R', a second cluster of nodes 520 for a face set 'G', and a third cluster of nodes 530 for a face set 'B'. As part of indexing a cast of characters for video, distance determination sub-module 350 may calculate coordinates for nodes that represent an average of the neighborhood points of a cluster. For example, cluster of nodes 510 may have a first node 515 that represents an average of the neighborhood points of cluster of nodes 510. Similarly cluster of nodes 520 and 530 may have nodes 525 and 535 that represent averages of the neighborhood points of cluster of nodes 520 and 530, respectively. As FIG. 5A illustrates, when an embodiment makes a distance determination using a function like the local neighbor distance function of Eq. (1), which is represented by the distances between nodes 515, 525, and 535, the distance determinations or "separations" of the clusters may be more robust to outliers than using a simple L2 distance $\|x_{im} - x_{jn}\|$, or the measure of distance between two closest boundary nodes of each cluster of nodes.

Distance Measure Between Two Face Sets

As mentioned previously, face sets with larger amounts of overlap may generally have a greater probability of belonging to the same character. For a distance measure between two face sets, it may be intuitive to summarize 1 minimum local neighbor distances $d(x_{im}, x_{jn})$ to evaluate the face set overlap.

$$d(S_i, S_j) = \sum_l \min_{x_{im} \in S_i, x_{jn} \in S_j} (d(x_{im}, x_{jn})) \quad (3)$$

Where $\min_l$ is the l-th minimum distance of $d(x_{im}, x_{jn})$, $\forall x_{im} \in S_i$ and $\forall x_{jn} \in S_j$. If there is enough of an overlap between face set Si and Sj, or the two face sets are near enough separately, the summary of $\min_l(d(x_{im}, x_{jn}))$ may be relatively small. Consequently, an embodiment such as apparatus 300 may determine that face set Si and Sj belong to the same character with a high degree of probability. Otherwise, an embodiment may choose not to merge the two face sets until they are bridged by other neighbored face sets. In other words, when an embodiment employs a local neighbor distance to separate face sets, or otherwise determine how the face sets are associated with one another, the embodiment may help eliminate disturbances caused from outliers and achieve greater accuracy when measuring the similarity between face sets, as illustrated in FIG. 5A.

Main Cast Detection

After the distance determination sub-module 350 calculates the distance measures between face sets, NCuts cast detection sub-module 360 may approach the main cast detection process as a graph partitioning problem, i.e. graph cut. NCuts cast detection sub-module 360 may represent the face sets as a weighted undirected graph G=(V,E), where the nodes V of the graph are the face sets and the edges are the similarities between pair-wise face sets. For face set clustering, NCuts cast detection sub-module 360 may seek a suitable or potentially an optimal partition $C_1, C_2, K, C_m$ such that the similarity among the nodes in a sub-graph $C_i$ is high and across similarity between sub-graphs $C_i, C_j$ ($i \neq j$) is low. To optimally partition a graph constituted by face sets, NCuts cast detection sub-module 360 may employ a normalized cut algorithm.

Normalized Graph Cuts

A graph G=(V,E) can be partitioned into two disjoint sub-graphs A and B with A∪B=V and A∩B=Φ, by removing edges connecting the two parts. The degree of dissimilarity between these two sub-graphs may be computed as a total weight of the edges that have been removed. In graph theoretic language, this may be referred to as the "cut":

$$\text{cut}(A, B) = \sum_{u \in A, v \in B} w(u, v) \quad (4)$$

A suitable or potentially an optimal bipartition of a graph may be the one that minimizes this cut value. To avoid unnatural bias when partitioning small sets of points, NCuts cast detection sub-module 360 may use a disassociation measure of a "normalized cut (Ncut)":

$$Ncut(A, B) = \frac{\text{cut}(A, B)}{\text{assoc}(A, V)} + \frac{\text{cut}(A, B)}{\text{assoc}(B, V)} \quad (5)$$

where $\text{assoc}(A,V) = \Sigma_{u \in A, t \in V} w(u,t)$ is the total connection from the nodes in A to all nodes in the graph and assoc(B,V) is similarly defined. Given a partition of the graph, i.e., dividing V into two disjoint sets A and B, X may be a N=|V| dimensional indication vector, $x_i$=1 if node i is in A and −1 if node i is in B. If one lets $d(i)=\Sigma_j w(i,j)$ and D be and N×N diagonal matrix with d on its diagonal, w be an N×N symmetrical matrix with $W(i,j)=w_{ij}$, the approximate discrete solution to minimizing NCuts may be found by solving the generalized eigenvalue system, $$(D-W)Y = \lambda DY \quad (6)$$

where Y is a linear transformation of X and can be used for partition by a threshold.

Cast Detection Algorithm

For two face sets $S_i$ and $S_j$, the graph edge weight $w_{ij}$ may be defined as:

$$w_{ij} = \begin{cases} e^{-\frac{d^2(S_i, S_j)}{\sigma^2}} & \text{if } S_j \text{ is the } n \text{ nearest neighbor of } S_i \\ 0 & \text{otherwise} \end{cases} \quad (7)$$

For example, n may be set to 1/15th ~1/20th of the number of face sets, while σ may be set to 0.8, which may approximate the threshold that two faces are from the same character in a SIFT feature space. By using an NCuts clustering approach, NCuts cast detection sub-module 360 may employ a cast detection algorithm that consists of the following process: 1. Given the face sets detected by a feature extraction module, set up a weighted graph G=(V,E) using distance function defined by equations (2) and (4). 2. From the graph, create matrices W and D to solve the eigenvalue system (D−W) x=λDx. 3. Use the eigenvector with the second smallest eigenvalue to bipartition the graph by finding the splitting point with the minimum Ncut. 4. Recursively partition the sub-graph when the stopping criterion is not satisfied. Whether continue to bipartition a sub-graph may be determined by attempting a new bipartition. A sub-graph may be partitioned if either of the following two conditions is satisfied: (a) The Ncut(A,B) of the trying bipartition is below a pre-selected value. (b) Computing the histogram of the eigenvector values and the ratio between the minimum and the maximum values in the bins is not smaller than a pre-selected threshold.

Ranking of Characters in Cast

In one or more embodiments, the cast detection module, such as cast indexing module 340 of FIG. 3, may generate face set clusters for characters that frequently appear in a video. To sort the important characters and analyze their relationships in scenes of the video, cast indexing module 340 may output or transmit those face set clusters to cast ranking module 370 to further rank cast characters (clusters of face sets) by a factor, such as an Importance Factor (IF) calculated by IF calculation sub-module 380. More important actors may generally appear with higher durations of appearance, or appearance time. In addition to determining appearance time for characters in a video, IF calculation sub-module 380 may also determine or calculate the frequency with which they appear, or appearance frequency. Additionally, certain actors may frequently appear with others in various scenes. Consequently, IF calculation sub-module 380 may measure or discover how frequently characters appear in various scenes, as well as their relationships or association with other characters, based on their joint appearance frequencies in the various scenes.

The IF calculation sub-module 380 may also rank characters of a video using one or more other measures or factors. For example, IF calculation sub-module 380 may rank characters based on a scene rank or a "page rank" factor. The scene/page rank factor may be analogous to the PageRank™ technology of Google™ web searching. In other words, each character may be viewed as a web page where joint appearances of multiple characters in a scene may be viewed as linked edges among them. If one character has many connected edges with others, or the character is connected to some one or more important characters, the page rank value may be relatively large. In one or more embodiments, therefore, a module like IF calculation sub-module 380 may rank the detected characters by an importance factor, wherein the IF may take into consideration a linear weighted average of the factors of appearance time, appearance frequency, and page rank. As an example calculation of an IF, an embodiment may calculate the IF for a character $C_i$, by using the following formula:

$$IF(C_i) = w_t A_t(C_i) + w_f A_f(C_i) + w_p A_p(C_i) \quad (8)$$

where $A_t(\cdot)$ is the Appearance Time (AT) score, $A_f(\cdot)$ is the Appearance Frequency (AF) score and $A_p(\cdot)$ is the page rank score. For example, one or more embodiments may use the following weights: $w_t=0.2$, $w_f=0.3$, $w_p=0.5$, when calculating the IF for a character. The page rank score may be calculated using the following process. For characters $C_j$, $i=1, 2 \ldots N$, the page rank value of $C_j$ may be defined as:

$$A_p(C_i) = (1-d) + d \sum_{j \neq i} A_p(C_j)/L(C_j), i = 1, \ldots, N \quad (9)$$

where $A_p(C_i)$ is the page rank score of the character $C_i$, $A_p(C_j)$ is the page rank score of character $C_j$ which links to character $C_i$, i.e. $C_j$ jointly appears with $C_i$ in a particular scene. $L(C_j)$ may represent the outbound links of $C_j$, i.e., the number of characters that jointly appeared with $C_j$. The variable d may represent a damping factor. When analyzing scenes of a video, each character may be initially assigned a starting page rank value $A_p(C_i)=1$, with the damping factor set to 0.8. An embodiment may then employ an iterative process to calculate the page rank scores of the individual characters. The appearance time $A_t(C_i)$ and the appearance frequency $A_f(C_i)$ scores may be calculated according to the character appearance time and the clustered face set number. In more detail, the two scores may be defined as follows:

$$A_t(C_i) = \frac{C_i's \text{ appearing time}}{\sum_j C_j's \text{ appearing time}}; \quad (10)$$

$$A_f(C_i) = \frac{C_i's \text{ face set number}}{\sum_j C_j's \text{ face set number}}. \quad (11)$$

The appearance time (represented by appearing time in the formula) and the appearance frequency (appearing frequency) scores may be useful factors when an embodiment determines whether a character is important on its own, without consideration of the association of the character with other characters. The page rank scores may reflect the importance of a character based on relationships that the character may have with other characters in the video. For example, a character that appears frequently with other characters, including appearances with important characters, may have a relatively high page rank score.

Using equations like equations (10) and (11), an embodiment may determine the character relationships by a page rank analysis. An illustrative example for the characters of FIG. 5A is shown in FIG. 5B, with the corresponding calculated IF scores listed in the table of FIG. 5C. In the example illustrated by FIGS. 5B and 5C, face sets 545 may be created from a section of scenes 540. The three characters that appear in scenes 540, may be referred to as character "r", character "g", and character "b" and represented as "Cr", "Cg", and "Cb", respectively. As face sets 545 in FIG. 5B show, Cr may appear in scenes 2, 3, 4, and 5. Similarly, Cg may appear in scenes 1, 2, 3, and 4, while Cb only appears in scenes 5 and 6. Since Cg and Cr appear with each other in four scenes, represented by the four lines between the nodes of the clusters 550, Cg and Cr may be considered more important than Cb, who only appears in one scene with Cr (scene 5). In other words, $C_r$ may be deemed more important than Cg since Cr has more relationships with other characters (element 555).

The table of FIG. 5C shows example factors that may be calculated by an IF calculation module for the three characters of FIGS. 5A and 5B. Columns 560, 565, and 570 may represent the different factors calculated for characters Cr, Cg, and Cb, respectively. In the table, row 575 shows the appearance times tabulated for each of the characters. Similarly, rows 580, 585, and 590 show the appearance frequency, links or appearances that the characters have with other characters, and page rankings for the characters. Row 595 shows example resulting IF factors that may be calculated for each of the three characters using the various factors (elements 575, 580, 585, and 590). As the table illustrates, even though Cb may appear for a greater duration, with At(Cb)=0.6, the appearance time may not be given much consideration, since the corresponding appearance frequency score, Af(Cb)=0.2, and page rank score, Ap(Cb)=0.16, are relatively low.

Another embodiment of the invention may be implemented as a program product, such as firmware, for use with a computing device or platform to detect and/or index characters of videos. The program(s) of the program product may define functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer, such as on a platform motherboard); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

The routines executed to implement the embodiments of the invention, may be part of a component, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus an embodiment should not be limited to use solely in any specific application identified and/or implied by such nomenclature.

Figure 6:
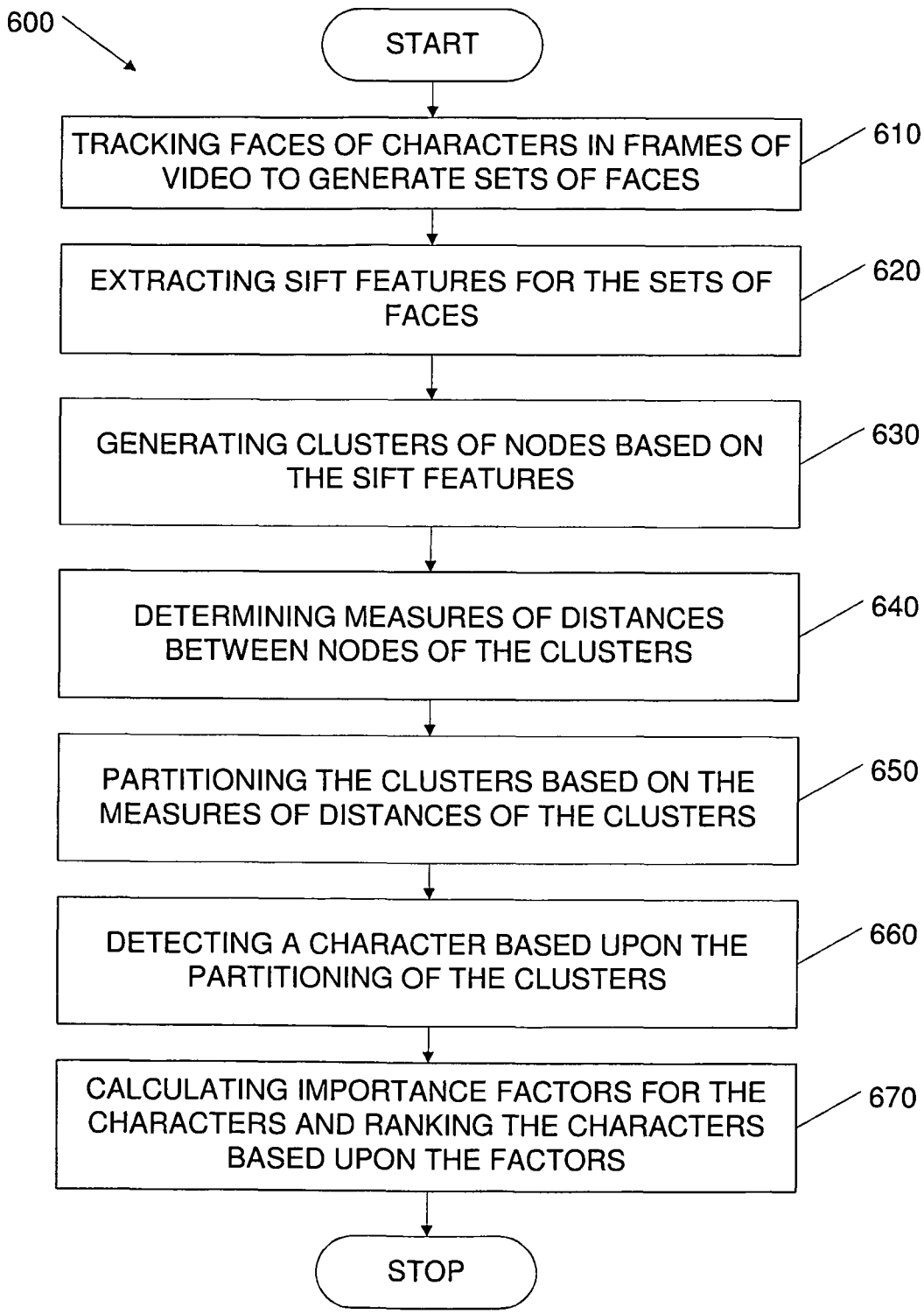
FIG. 6 illustrates a method of tracking faces of a video and partitioning clusters to detect characters in a video.

FIG. 6 depicts a flowchart 600 that illustrates a method, which may be implemented by way of a program product such as software or firmware, to enable a computing device to detect and/or index characters of videos. For example, the method may be executed as software instructions of a program, or implemented as a state-machine hardware or firmware in an application-specific integrated circuit chip of an embedded system that detects and/or indexes characters in video clips or movies. Flowchart 600 begins with tracking faces of characters in frames of video to generate sets of faces (element 610) and extracting SIFT features for the sets of faces (element 620). For example, video processing application 145 may have software routines which perform the functions of feature extraction module 150, cast indexing module 160, and cast ranking module 170. Video processing application 145 may track faces of characters in frames of video, such as a home video or video surveillance for a building or warehouse.

A method according to flowchart 600 may continue by generating clusters of nodes based on the SIFT features (element 630) and determining measures of distances between nodes of the clusters (element 640). For example, the software modules of video processing application 145 may generate clusters of nodes, similar to the clusters of nodes depicted in the graph 490 of FIG. 4C, based on the SIFT features of faces contained in a surveillance video. Video processing application 145 may then determine measures of distances between nodes of the individual clusters, wherein the nodes may represent the average locations of the neighborhood nodes.

A method according to flowchart 600 may then partition the clusters based on the measures of distances (element 650) and detect one or more characters based upon the partitioning (element 660). Continuing with our previous example, video processing application 145 may partition three clusters corresponding to the faces of the three characters in a surveillance video and associate the faces to characters stored in a profile database 125. Video processing application 145 may then calculate importance factors for the characters detected in the surveillance video (element 670). For example, cast ranking module 170 of video processing application 145 may determine how many times a particular person or character enters the building, as well as the times that the person visits the building and how often the person appears with one or more other people.

It will be apparent to those skilled in the art having the benefit of this disclosure that the present invention contemplates systems, apparatuses, and computer program products that detect and/or index characters in video. It is understood that the form of the invention shown and described in the detailed description and the drawings are to be taken merely as examples. It is intended that the following claims be interpreted broadly to embrace all the variations of the embodiments disclosed.

Although the present invention and some of its aspects have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, or methods described in the specification. As one of ordinary skill in the art will readily appreciate from the disclosure of the present invention, processes, machines, manufacture, compositions of matter, means, or methods presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, or methods.

What is claimed is:

1. An apparatus, comprising:
   a feature extraction module to identify images of a video as a plurality of faces of characters of the video and features associated with the plurality of faces; and
   a cast indexing module coupled with the feature extraction module to create a cast of characters of the video based upon the plurality of faces of characters of the video, the cast indexing module to partition the plurality of faces into sets of faces by forming clusters of the faces based upon the features, partitioning the clusters, and detecting the cast of characters based upon partitions, wherein:
   the sets of faces represent the cast of characters of the video;
   different sets of faces represent different characters of the cast of characters; and
   the faces within a set of faces represent the faces of a single character of the cast of characters.

2. The apparatus of claim 1, wherein:
   the plurality of faces of the characters of the video comprises a plurality of face sets, wherein:
   a face set comprises a set of faces of a single character in a shot;
   a shot comprises a set of video frames captured by a single camera in a consecutive recording session;
   the feature extraction module comprises a shot detection module to detect shots of the video; and the partitioning the plurality of faces into sets of faces comprises merging face sets from separate shots of a character of the characters of the video into a single face set of the character.

3. The apparatus of claim 2, wherein the feature extraction module is to detect and track faces of characters of the video to generate the face sets.

4. The apparatus of claim 3, wherein the detecting faces comprises detecting near frontal faces.

5. The apparatus of claim 2, wherein the shot detection module is to detect shot boundary and scene segmentation.

6. The apparatus of claim 2, wherein the feature extraction module is to normalize the faces of the face sets and to extract local scale invariant features from the face sets.

7. The apparatus of claim 6, wherein the feature extraction module is to use an active shape model-based (ASM-based) face alignment algorithm to detect facial landmarks and to apply scale invariant feature transforms to the facial landmarks to obtain the local scale invariant features.

8. The apparatus of claim 1, wherein the cast indexing module is to partition the plurality of faces of the characters of the video into sets of faces of the characters of the video by using at least one of a normalized cut process, a hierarchical clustering process, and a spectral clustering process.

9. The apparatus of claim 8, wherein the cast indexing module is to partition the plurality of faces of the characters of the video into sets of faces of the characters of the video by using a normalized cut process.

10. The apparatus of claim 9, wherein the cast indexing module is to determine a distance between representations of two faces by a local neighborhood distance.

11. The apparatus of claim 10, wherein the local neighborhood distance between a face $x_{im} \in S_i$ and a face $x_{jn} \in S_j$, wherein $S_i$ and $S_j$ comprise face sets, is defined as:

$$d(x_{im}, x_{jn}) = \frac{1}{k^2} \sum_{x_{ip} \in N(x_{im}), x_{jq} \in N(x_{jn})} \|x_{ip} - x_{jq}\|$$

wherein $N(x_{im})$ is a set of k nearest-neighbors of $x_{im}$ in $S_i$ for some fixed integer k, $N(x_{jm})$ is a set of k nearest-neighbors of $x_{jm}$ in $S_j$ for the fixed integer k, and $\|\cdot\|$ denotes $L_2$ distance between two faces.

12. The apparatus of claim 11, wherein:
the cast indexing module is to merge face sets $S_i$ and $S_j$ when the distance between face sets $S_i$ and $S_j$ is sufficiently small.

13. The apparatus of claim 12, wherein the cast indexing module is to merge face sets $S_i$ and $S_j$ and bridging face sets $\{S_b\}$ when:
the distance between $S_i$ and $S_j$ is not sufficiently small; and
face sets $S_i$ and $S_j$ are bridged by the bridging face sets $\{S_b\}$.

14. The apparatus of claim 1, wherein the cast indexing module is to determine a frequency of appearance of the characters of the cast of characters, a duration of appearance of the characters of the cast of characters, and scenes containing appearances of the characters of the cast of characters.

15. The apparatus of claim 1, further comprising a cast ranking module coupled with the cast indexing module, the cast ranking module to sort the characters of the cast of characters of the video via at least one of appearance times of the characters, appearance frequencies of the characters, and page rankings of the characters.

16. The apparatus of claim 15, wherein the cast ranking module is to rank the characters of the cast of characters of the video by importance factor (IF), wherein IF is determined by the formula:

$$IF(C_i) = w_t A_t(C_i) + w_f A_f(C_i) + w_p A_p(C_i),$$

wherein $C_i$ is a character of the cast of characters of the video, $A_t$ is an Appearance Time score of $C_i$, $A_f$ is an Appearance Frequency score of $C_i$, the w's represent weights wherein the weights total to 1.0, and $A_p$ is a page rank score of $C_i$.

17. The apparatus of claim 16, wherein the page rank value $A_p$ of a character $C_i$ of a character of the cast of characters of the video is defined recursively as follows:
1. Initially, $A_p=1$ for each character of the cast of characters of the video,
2. At each further iteration, $$A_p(C_i) = (1-d) + d \sum_{j \neq i} A_p(C_j) / L(C_j),$$

wherein
$L(C_j)$=the number of characters of the cast of characters appearing jointly with $C_j$, d is a dampening factor, and $A_p(C_j)$ is a page rank score of a character $C_j$ of the previous iteration, wherein $C_j$ jointly appears with $C_i$ in a particular scene of the video.

18. A system, comprising:
storage medium to store video, wherein the video comprises faces of characters of the video;
a feature extraction module to identify images of a video as a plurality of faces of characters of the video and features associated with the plurality of faces and to group the faces into face sets of the characters of the video, wherein:
a face set comprises a set of faces of a single character in a shot; and
a shot comprises a set of video frames captured by a single camera in a consecutive recording session; and
the feature extraction module comprises a shot detection module to detect shots of the video; and
a cast indexing module coupled with the feature extraction module to detect characters of the video to determine a cast of the characters of the video by forming clusters of faces based upon the features, partitioning the clusters, and detecting the characters based upon partitions.

19. The system of claim 18, wherein:
the cast indexing module is to form the clusters by merging face sets from separate shots of a character of the characters into a single face set of the character.

20. The system of claim 19, wherein:
the feature extraction module is to:
detect and track faces of characters to generate the face sets;
normalize the faces of the face sets;
extract local scale invariant features from the face sets by using an active shape model-based (ASM-based) face alignment algorithm to detect facial landmarks; and
apply scale invariant feature transforms to the facial landmarks to obtain the local scale invariant features;
the shot detection module is to detect shot boundary and scene segmentation;
the cast indexing module is to partition the plurality of faces of characters into sets of faces by merging face sets from separate shots of a character into a single face set by means of a normalized cut process, the normalized cut process using a local neighborhood distance to determine a distance between representations of two faces, wherein:

the local neighborhood distance between a face $x_{im} \in S_i$ and a face $x_{jn} \in S_j$, wherein $S_i$ and $S_j$ comprise face sets, is defined as:

$$d(x_{im}, x_{jn}) = \frac{1}{k^2} \sum_{x_{ip} \in N(x_{im}), x_{jq} \in N(x_{jn})} \|x_{ip} - x_{jq}\|$$

wherein $N(x_{im})$ is a set of k nearest-neighbors of $x_{im}$ in $S_i$ for some fixed integer k, $N(x_{jm})$ is a set of k nearest-neighbors of $x_{jm}$ in $S_j$ for the fixed integer k, and $\|\cdot\|$ denotes $L_2$ distance between two faces; and the cast indexing module is to determine a cast of characters for the video, a frequency of appearance of the characters of the cast of characters, a duration of appearance of the characters of the cast of characters, and scenes containing appearances of the characters of the cast of characters; and the system comprises a cast ranking module coupled with the cast indexing module, the cast ranking module to rank the characters of the cast of characters by importance factor (IF), wherein IF is determined by the formula:

$$IF(C_i) = w_t A_t(C_i) + w_f A_f(C_i) + w_p A_p(C_i),$$

wherein $C_i$ is a character of the cast of characters, $A_t$ is an Appearance Time score of $C_i$, $A_f$ is an Appearance Frequency score of $C_i$, $A_p$ is a page rank score of $C_i$, and the w's represent weights wherein the weights sum to 1.0; and the page rank value $A_p$ of a character $C_i$ is defined recursively as follows:

1. Initially, $A_p = 1$ for each character of the cast of characters,
2. At each further iteration, $$A_p(C_i) = (1 - d) + d \sum_{j \neq i} A_p(C_j) / L(C_j),$$

wherein $L(C_j)$ = the number of characters appearing jointly with $C_j$, d is a dampening factor, and $A_p(C_j)$ is a page rank score of a character $C_j$ of the previous iteration, wherein $C_j$ jointly appears with $C_i$ in a particular scene of the video.

21. A computer program product comprising a non-transitory computer usable medium having computer usable program code for identifying characters of a video, wherein the video comprises a plurality of video frames, the computer program product including:

computer usable program code to identify images of a video as a plurality of faces of characters of the video and features associated with the plurality of faces; and computer usable program code to create a cast of characters of the video based upon the plurality of faces of characters of the video, the computer usable program code to partition the plurality of faces into sets of faces by forming clusters of the faces based upon the features, partitioning the clusters, and detecting the cast of characters based upon partitions, wherein:

the sets of faces represent the cast of characters of the video;

different sets of faces represent different characters of the cast of characters; and the faces within a set of faces represent the faces of a single character of the cast of characters.

22. The computer program product of claim 21, wherein:

the plurality of faces of the characters of the video comprises a plurality of face sets, wherein:

a face set comprises a set of faces of a single character in a shot;

a shot comprises a set of video frames captured by a single camera in a consecutive recording session;

the computer usable program code for extracting comprises computer usable program code to detect shots of the video; and the computer usable program code for partitioning comprises computer usable program code to merge face sets from separate shots of a character of the characters of the video into a single face set of the character.

23. The computer program product of claim 22, wherein:

the computer program product further comprises computer usable program code to:

detect and track faces of characters to generate the face sets;

normalize the faces of the face sets;

extract local scale invariant features from the face sets by using an active shape model-based (ASM-based) face alignment algorithm to detect facial landmarks; and apply scale invariant feature transforms to the facial landmarks to obtain the local scale invariant features;

the computer usable program code for detecting shots to detectshot boundary and scene segmentation;

the computer usable program code for identifying images comprises computer usable program code to detect shots of the video;

the computer usable program code for partitioning comprises computer usable program code to partition the plurality of faces of characters into sets of faces by merging face sets from separate shots of a character into a single face set by means of a normalized cut process, the normalized cut process using a local neighborhood distance to determine a distance between representations of two faces, wherein:

the local neighborhood distance between a face $x_{im} \in S_i$ and a face $x_{jn} \in S_j$, wherein $S_i$ and $S_j$ comprise face sets, is defined as:

$$d(x_{im}, x_{jn}) = \frac{1}{k^2} \sum_{x_{ip} \in N(x_{im}), x_{jq} \in N(x_{jn})} \|x_{ip} - x_{jq}\|$$

wherein $N(x_{im})$ is a set of k nearest-neighbors of $x_{im}$ in $S_i$ for some fixed integer k, $N(x_{jm})$ is a set of k nearest-neighbors of $x_{im}$ in $S_j$ for the fixed integer k, and $\|\cdot\|$ denotes $L_2$ distance between two faces; and the computer usable program code for partitioning comprises computer usable program code to determine the cast of characters for the video, a frequency of appearance of the characters of the cast of characters, a duration of appearance of the characters of the cast of characters, and scenes containing appearances of the characters of the cast of characters; and the computer program product further comprises computer usable program code to rank the characters of the cast of characters by importance factor (IF), wherein IF is determined by the formula:

$$IF(C_i) = w_t A_t(C_i) + w_f A_f(C_i) + w_p A_p(C_i),$$

wherein $C_i$ is a character of the cast of characters, $A_t$ is an Appearance Time score of $C_i$, $A_f$ is an Appearance Frequency score of $C_i$, $A_p$ is a page rank score of $C_i$, and the w's represent weights wherein the weights sum to 1.0; and the page rank value $A_p$ of a character $C_i$ is defined recursively as follows:
1. Initially, $A_p=1$ for each character of the cast of characters,
2. At each further iteration, $$A_p(C_i) = (1-d) + d \sum_{j \neq i} A_p(C_j)/L(C_j),$$

wherein
  $L(C_j)$=the number of characters appearing jointly with $C_j$, d is a dampening factor, and $A_p(C_j)$ is a page rank score of a character $C_j$ of the previous iteration, wherein $C_j$ jointly appears with $C_i$ in a particular scene of the video.

* * * * *

UNITED STATES PATENT AND TRADEMARK OFFICE
CERTIFICATE OF CORRECTION

| | |
|---|---|
| PATENT NO. | : 8,705,810 B2 |
| APPLICATION NO. | : 12/006019 |
| DATED | : April 22, 2014 |
| INVENTOR(S) | : Tao Wang et al. |

It is certified that error appears in the above-identified patent and that said Letters Patent is hereby corrected as shown below:

On the title page, in item (56), in column 2, under "Other Publications", line 10, delete "Cont." and insert -- Conf. --, therefor.

On the title page, in item (56), in column 2, in "Abstract", line 3, after "comprise" delete "an apparatus".

In the Drawings

On sheet 2 of 6, in Figure 2A, line 1, above "SHOTS" delete "2/6".

In the Claims

In column 15, line 44, in claim 11, delete "$N(x_{jm})$" and insert -- $N(x_{jn})$ --, therefor.

In column 15, line 45, in claim 11, delete "$x_{jm}$" and insert -- $x_{jn}$ --, therefor.

In column 17, line 15, in claim 20, delete "$N(x_{jm})$" and insert -- $N(x_{jn})$ --, therefor.

In column 17, line 16, in claim 20, delete "$x_{jm}$" and insert -- $x_{jn}$ --, therefor.

In column 18, line 34, in claim 23, delete "detectshot" and insert -- detect shot --, therefor.

In column 18, line 56, in claim 23, delete "$N(x_{jm})$" and insert -- $N(x_{jn})$ --, therefor.

In column 18, line 57, in claim 23, delete "$x_{im}$" and insert -- $x_{jn}$ --, therefor.

Signed and Sealed this
Eighth Day of July, 2014

Michelle K. Lee
*Deputy Director of the United States Patent and Trademark Office*